(12) United States Patent
Khan et al.

(10) Patent No.: US 11,441,029 B1
(45) Date of Patent: Sep. 13, 2022

(54) PACKAGING FILMS, AND METHODS OF PREPARATION THEREOF

(71) Applicant: King Abdulaziz University, Jeddah (SA)

(72) Inventors: Anish Khan, Jeddah (SA); Abdullah M Asiri, Jeddah (SA); Tehseen Kamal, Jeddah (SA); Mohammad Jawaid, Selangor (MY); Aziman Nurain, Negeri Sembilan (MY)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/579,004

(22) Filed: Jan. 19, 2022

(51) Int. Cl.
| | | |
|---|---|---|
| *C08L 67/02* | (2006.01) | |
| *C08J 5/18* | (2006.01) | |
| *B65D 81/24* | (2006.01) | |
| *B29K 105/00* | (2006.01) | |
| *B29C 48/00* | (2019.01) | |
| *B29C 48/08* | (2019.01) | |
| *B29K 67/00* | (2006.01) | |

(52) U.S. Cl.
CPC .............. *C08L 67/02* (2013.01); *B65D 81/24* (2013.01); *C08J 5/18* (2013.01); *B29C 48/0018* (2019.02); *B29C 48/08* (2019.02); *B29K 2003/00* (2013.01); *B29K 2067/04* (2013.01); *B29K 2105/0011* (2013.01); *C08J 2367/02* (2013.01); *C08J 2403/04* (2013.01)

(58) Field of Classification Search
None
See application file for complete search history.

(56) References Cited

U.S. PATENT DOCUMENTS

| | | | | |
|---|---|---|---|---|
| 2014/0296442 A1* | 10/2014 | Fiori | ......................... | C08F 2/44 526/346 |
| 2021/0363335 A1* | 11/2021 | LaPray | ..................... | C08L 3/02 |

* cited by examiner

*Primary Examiner* — Robert T Butcher
(74) *Attorney, Agent, or Firm* — WCF IP (57) ABSTRACT

A packaging film is provided. The packaging film includes a polymer matrix composed of poly (butylene succinate) (PBS), and a modified tapioca starch (TPS), where a weight ratio (w/w) of the PBS to the TPS is in a range of 3:2 to 2:3. The packaging film also includes an antimicrobial composite including an organometallic compound dispersed within the polymer matrix. The packaging film has a water vapor permeability in a range of 94,000-95,000 micrometer gram per second per square meter per pascal (g·μm/m²·s·Pa). A method to prepare the packaging film is also disclosed. The packaging films of the present disclosure prevent or inhibit the growth of gram-positive bacteria and gram-negative bacteria, particularly on food surfaces.

9 Claims, 11 Drawing Sheets

PACKAGING FILMS, AND METHODS OF PREPARATION THEREOF

TECHNICAL FIELD

The present disclosure relates to the field of packaging films, and more specifically, the present disclosure relates to an antimicrobial film for food packaging, and a method of preparing the same.

BACKGROUND

The development of packaging films from biopolymers has become a main interest by food industry due to the growing concerns for food preservation and safety, in addition to demand from consumer towards high quality and improved shelf-life of food product. Conventionally, biopolymers such as poly(lactic acid) (PLA), polycaprolactone (PCL), polyhydroxybutyrate (PHB), poly(butylene adipate co-terephthalate) (PBAT), and poly(butylene succinate) (PBS), had been used as main structural ingredients for making the packaging films, owing to their good film forming ability as well as great thermal, mechanical and barrier properties. However, the lack of antimicrobial functional property has limited the use of these biopolymers for preserving perishable food product, especially fruits, vegetables, and meat. Efforts have been made to introduce bioactive agents into the biopolymer based packaging films; but the hydrophobic nature of the biopolymers had strongly embedded the antimicrobial effect of the bioactive agents.

Recent literature suggests the use of chitosan, carrageenan, zein, and fish gelatin as the main structural ingredients for making the packaging films, to overcome the drawbacks associated with the use of the conventional biopolymers. However, less structural integrity of these materials had substantially reduced their overall mechanical and thermal stabilities, thereby reducing their overall performance for heavy duty packaging applications.

Each of the aforementioned methods suffers from one or more drawbacks hindering their adoption. Accordingly, there exists a need to develop methods of improving the shelf life of the food products using bioactive agents for food packaging that are safe for human consumption, and that can withstand high temperatures, and also inhibit the growth of microorganisms without compromising on the quality of the food.

SUMMARY

The present disclosure relates to a packaging film. The packaging film imparts antimicrobial activity to a food product. The present disclosure also provides a method for preparing the packaging film.

In one aspect of the present disclosure, the packaging film includes a polymer matrix composed of poly (butylene succinate) (PBS); and a modified tapioca starch (TPS), where a weight ratio (w/w) of the PBS to the TPS is in a range of 3:2 to 2:3. In an embodiment, the PBS has a weight percentage in a range of 50-65% relative to a total weight of the packaging film. In another embodiment, the TPS has a weight percentage in a range of 35-45% relative to a total weight of the packaging film. The packaging film further includes an antimicrobial composite including an organometallic compound dispersed within the polymer matrix. In an embodiment, the organometallic compound is a zinc salt. The zinc salt can be one or more selected from a group consisting of zinc PCA (zinc salt of pyrrolidone carboxylic acid), zinc pyrrolidone, zinc pyrithione or a combination thereof. In an embodiment, the organometallic compound is zinc, bis[1-(hydroxy-.kappa.O)-2(1H)-pyridinethionato-.kappa.S2]-,(T-4)-. The antimicrobial composite is active against gram-positive and gram-negative bacteria. In an embodiment, the antimicrobial composite is active against one or more of Staphylococcus aureus, Escheria coli, and Salmonella typhimurium. In an embodiment, the antimicrobial composite has a weight percentage in a range of 1-2% relative to a total weight of the packaging film. The packaging film has a water vapor permeability in a range of 94,000-95,000 micrometer gram per second per square meter per pascal (g·μm/m$^2$·s·Pa), and an oxygen permeability in a range of 20,500-21,500 centimeter cube micrometer per second per square meter per pascal (cm$^3$·μm/m$^2$·s·Pa).

In another aspect of the present disclosure, a method of preparing the packaging film is described. The method includes dispersing the antimicrobial composite disposed within the polymer matrix to form a slurry. In an embodiment, the antimicrobial composite includes an organometallic compound dispersed within the polymer matrix. In an embodiment, organometallic compound is a zinc salt. The zinc salt can be one or more selected from a group consisting of zinc PCA (zinc salt of pyrrolidone carboxylic acid), zinc pyrrolidone, zinc pyrithione or a combination thereof. In an embodiment, the organometallic compound is zinc, bis[1-(hydroxy-.kappa.O)-2(1H)-pyridinethionato-.kappa.S2]-,(T-4)-. In an embodiment, the antimicrobial composite is obtained by solubilizing the organometallic compound in an organic solvent. The antimicrobial composite is dispersed within the polymer matrix composed of PBS and TPS, to form a slurry. In an embodiment, the antimicrobial composite is dispersed within the polymer matrix composed of PBS and TPS, for a reaction time of 20 minutes to 3 hours, to form the slurry. The weight ratio of the PBS to the TPS is in a range of 3:2 to 2:3. The packaging film has a water vapor permeability in a range of 94,000-95,000 micrometer gram per second per square meter per pascal (g·μm/m$^2$·s·Pa), and an oxygen permeability in a range of 20,500-21,500 cm$^3$·μm/m$^2$·s·Pa.

The antimicrobial composite is active against gram-positive and gram-negative bacteria. In an embodiment, the antimicrobial composite is active against one or more of Staphylococcus aureus, Escheria coli, and Salmonella typhimurium. In an embodiment, the PBS has a weight percentage in a range of 50-65% relative to a total weight of the packaging film. In an other embodiment, the TPS has a weight percentage in a range of 35-45% relative to a total weight of the packaging film. In yet another embodiment, the antimicrobial composite has a weight percentage of 1-2% relative to a total weight of the packaging film.

The foregoing as well as other features and advantages of the present disclosure will be more fully understood from the following description, examples, and claims.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements. A skilled artisan will appreciate that various alternate embodiments and forms may be prepared. Examples, therefore, given are only for illustration purposes without any intention to restrict the embodiments to a given set of examples. Specific functional aspects are provided merely to enable a person skilled in the art to perform the invention and should not be construed as limitations of the invention. Any method steps and processes described herein are not to be construed as necessarily requiring their performance in the particular order discussed or illustrated, unless specifically identified as an order of performance. It is also to be understood that additional or alternative steps may be employed, unless otherwise indicated.

As used herein, "amount" refers to the level or concentration of one or more elements or end-products of the system and the methods of the present disclosure.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

As used herein, the term "about" or "between" refers to a ±20% to ±10% variation from the nominal value unless otherwise indicated.

Embodiments of the present disclosure are directed towards a packaging film having an antimicrobial activity. Antimicrobial food packaging is a type of active packaging that incorporates antimicrobial substances in packaging films to reduce pathogenic microorganisms and eliminate unpleasant changes in a food product, such as food quality, which in turn enhances the product's shelf life. The packaging film finds application packaging of the food products, particularly, perishable foods and beverages such as meat, poultry, fish, dairy products, juices fresh produce, frozen foods, and frozen snacks. The packaging film may also be used for confectionary packaging, and packaging of baked goods such as cookies, cereal and nutrition bars. The packaging film of the present disclosure includes a polymeric matrix, including a blend of poly (butylene succinate) (PBS) and a compatibilizing agent such as, modified tapioca starch (TPS), into which is dispersed an antimicrobial composite. The effectiveness of the antimicrobial composite in the packaging film was evaluated for its ability to preserve food products. It was observed the packaging film of the present disclosure possessed excellent antimicrobial activity against gram-positive, and gram-negative bacteria, particularly against, *Staphylococcus aureus, Escherichia coli*, and *Salmonella Typhimurium*, suggesting that the packaging films of the present disclosure can be used to preserve food products.

In an embodiment, packaging film is composed of the polymer matrix. The polymer matrix is a blend of PBS and the compatibilizing agent. The polymer matrix is prepared by cast film method. In an embodiment, the compatibilizing agent is the TPS. The purpose of the compatibilizing agent is to improve the interfacial tension, and enhance the adhesion between the different phases at the solid state, with consequent improvement in microstructure uniformity and in material, mechanical and adhesive performance. Also, the addition of TPS to the PBS impacts the polymer final properties, the crystallizing ability, and also reduces the stiffness of the PBS homopolymer. The weight ratio of the PBS to the TPS can be altered depending on the degree of hydrophobicity desired for the polymer matrix. In an embodiment, a weight ratio of the PBS to the TPS is in a range of 2:3 to 3:2. The packaging film may optionally be composed of other polymers known in the art. In an embodiment, the PBS has a weight percentage in a range of 50-65% relative to a total weight of the packaging film. In another embodiment, the TPS has a weight percentage in a range of 35-45% relative to a total weight of the packaging film.

The packaging film also includes the antimicrobial composite dispersed within the polymeric matrix. The purpose of the antimicrobial composite is to impart antimicrobial activity against gram-positive and gram-negative bacteria, particularly against, *Staphylococcus aureus, Escherichia coli*, and *Salmonella Typhimurium*. The antimicrobial composite is an organometallic compound including a metal-carbon bond. In an embodiment, the organometallic compound is a zinc salt of an organic compound or a zinc salt of an organic compound. Examples of the zinc salts of organic compound include, but are not limited to, zinc PCA (zinc salt of pyrrolidone carboxylic acid), zinc pyrrolidone, zinc pyrithione or a combination thereof. In an embodiment, the organometallic compound is zinc pyrithione. In another embodiment, the organometallic compound is zinc, bis [1-(hydroxy- .kappa.O)-2(1H)-pyridinethionato-.kappa.S2]-,(T-4)-. In an embodiment, the organometallic compound is a zinc salt of an inorganic compound. Examples of the zinc salts of the inorganic compound include, but are not limited to, zinc oxide, zinc sulfate, zinc chloride, and a combination thereof. In an embodiment, the antimicrobial composite has a weight percentage in a range of 1-2% relative to a total weight of the packaging film.

Figure 1:
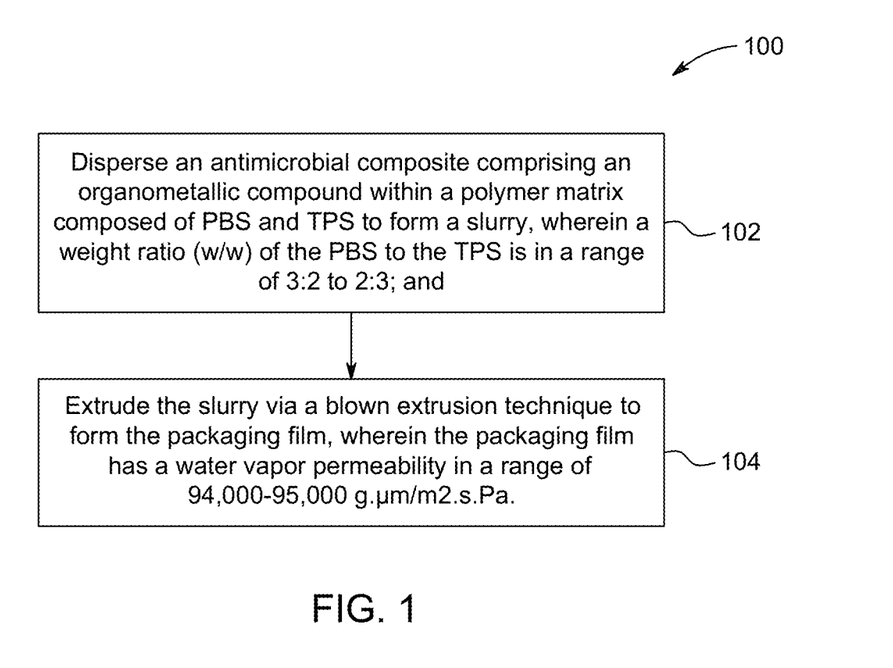
FIG. 1 is a schematic flow diagram of a method of preparing the packaging film of the present film of the present disclosure.
Figure 2A:
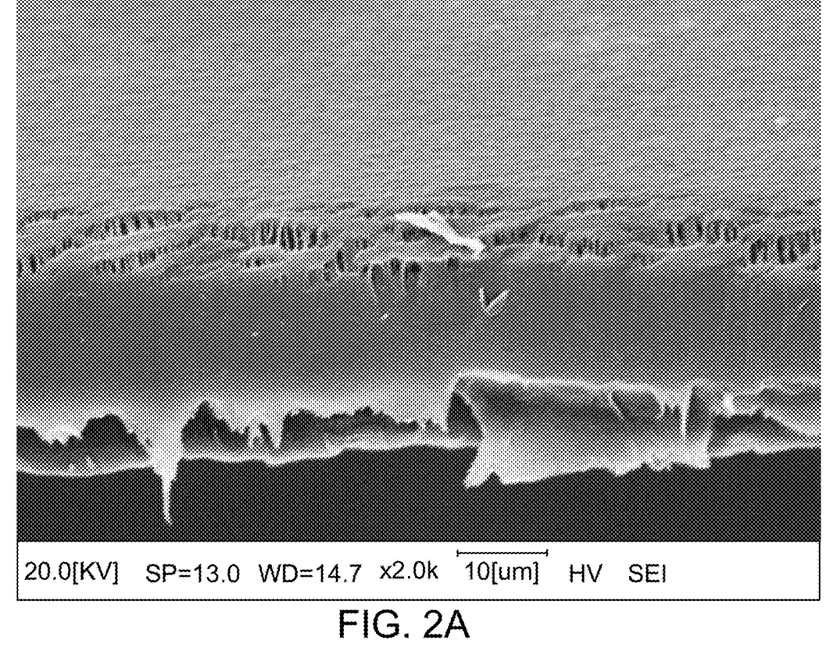
FIG. 2A to FIG. 2F shows a cross-sectional view of packaging films having varying weight ratios of PBS and TPS under scanning electron microscope (SEM)
Figure 2B:
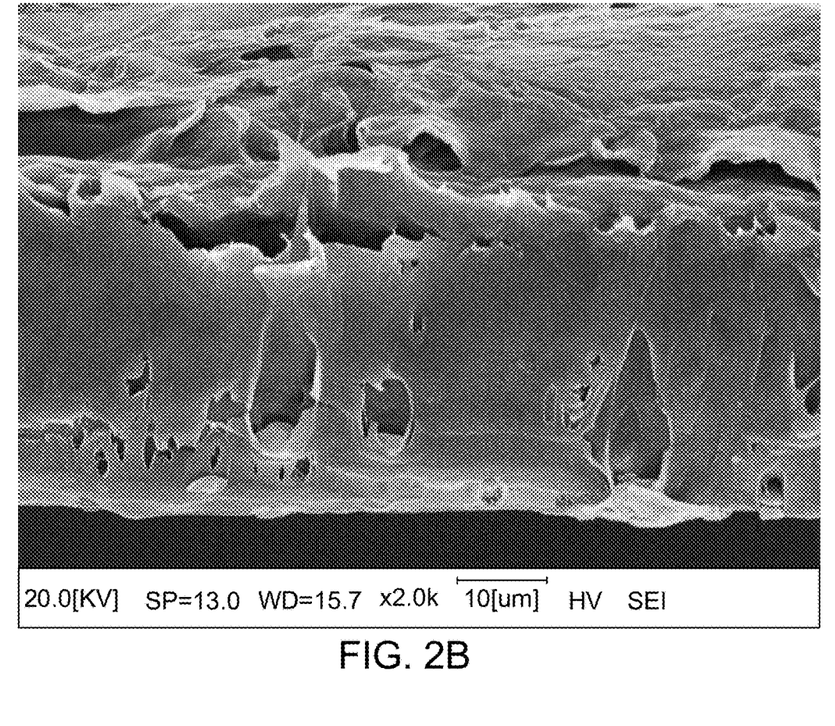
Figure 2C:
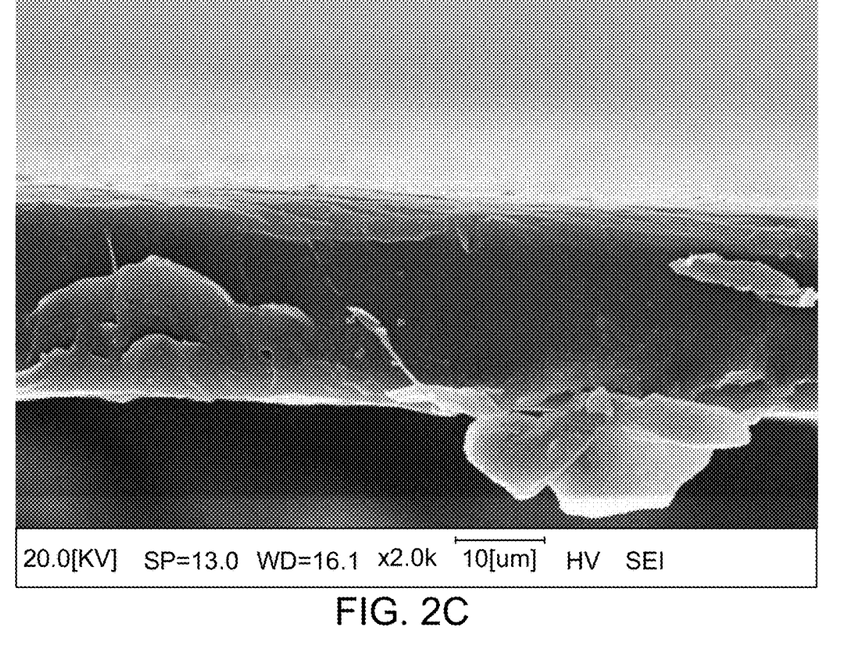
Figure 2D:
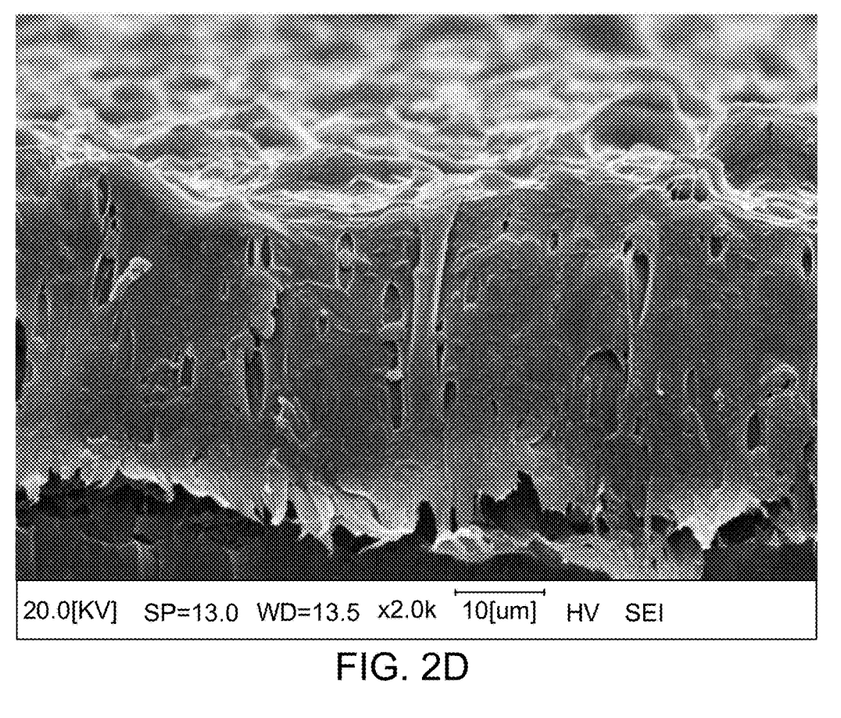
Figure 2E:
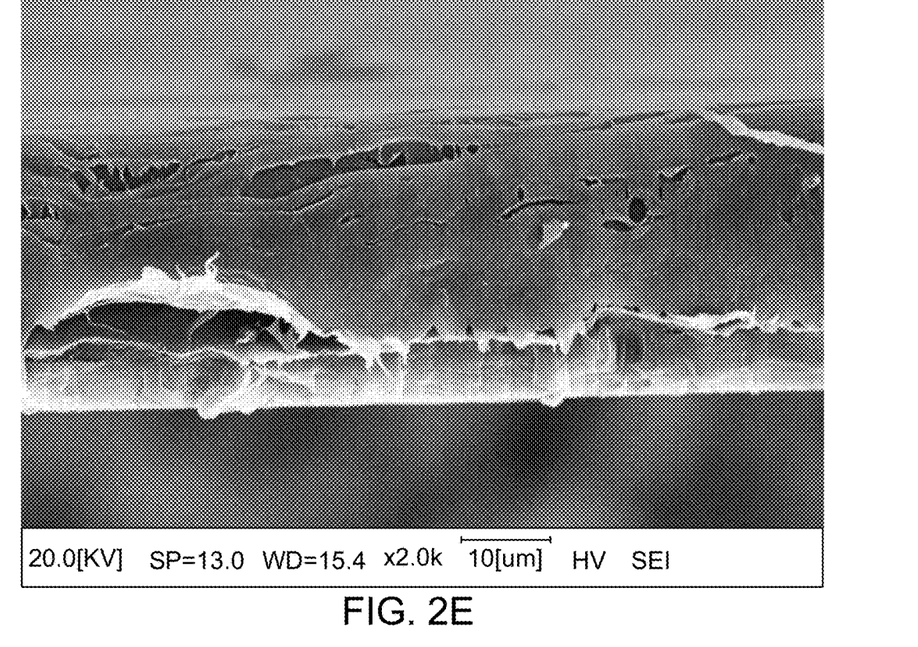
Figure 2F:
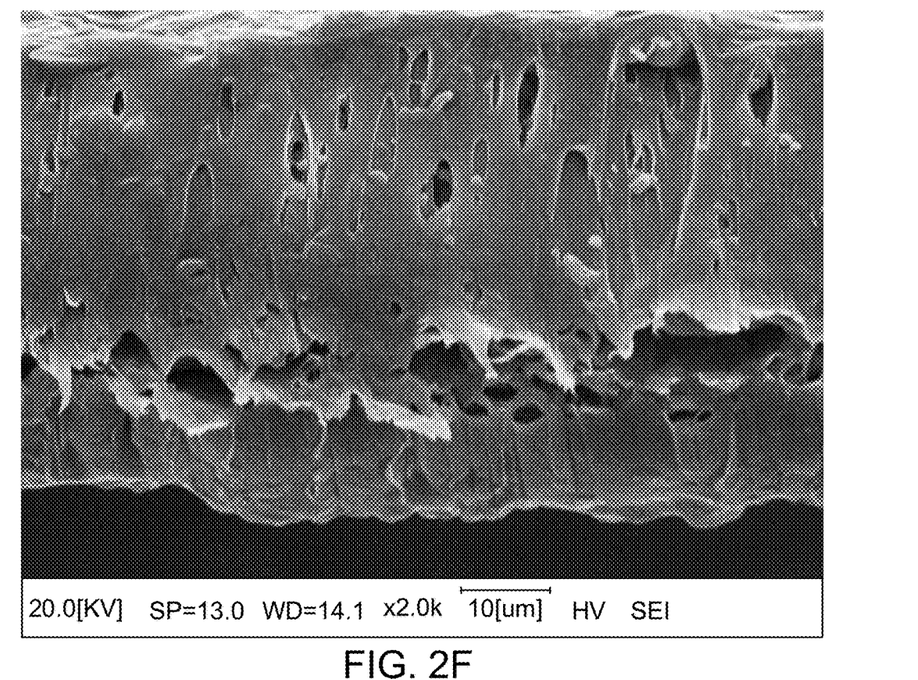

In an aspect, a method of preparing the packaging film is disclosed. At step 102, the method includes dispersing the antimicrobial composite consisting of the organometallic compound within the polymer matrix to form a slurry. In an embodiment, the antimicrobial composite is solubilized in an organic solvent prior to dispersion in the polymer matrix. In an embodiment, the organic solvent is a lower alcohol. The lower alcohol may be an ethanol or isopropanol. In an embodiment, the organometallic compound is a zinc salt of an organic compound or a zinc salt of an organic compound. Examples of the zinc salts of organic compound include, but are not limited to, zinc PCA (zinc salt of pyrrolidone carboxylic acid), zinc pyrrolidone, zinc pyrithione or a combination thereof. In an embodiment, the organometallic compound is zinc pyrithione. In another embodiment, the organometallic compound is zinc, bis [1-(hydroxy-.kappa.O)-2(1H)-pyridinethionato-.kappa.S2]-,(T-4)-. In an embodiment, the organometallic compound is a zinc salt of an inorganic compound. Examples of the zinc salts of the inorganic compound include, but are not limited to, zinc oxide, zinc sulfate, zinc chloride, and a combination thereof. In an embodiment, the antimicrobial composite is dispersed within the polymer matrix including a blend of the PBS and TPS for a reaction time of 20 minutes to 3 hours, to form a slurry. The weight ratio of the PBS to the TPS can be altered depending on the degree of hydrophobicity desired for the polymer matrix. In an embodiment, a weight ratio of the PBS to the TPS is in a range of 2:3 to 3:2. In an embodiment, the PBS has a weight percentage in a range of 50-65% relative to a total weight of the packaging film. In another embodiment, the TPS has a weight percentage in a range of 35-45% relative to a total weight of the packaging film. In an embodiment, the antimicrobial composite has a weight percentage of 1-2% relative to a total weight of the packaging film.

At step 104, the method includes extruding the slurry via a blown extrusion technique to form the packaging film. The introduction of antimicrobials, by this technique, into the packaging film is to avoid surface growth on foods, such as the spoilage that may occur primarily on the surface of intact meat. The antimicrobials were gradually released from the packaging film, which may be better compared to the dipping and spraying technique. The techniques of directly adding preservatives may cause rapid diffusion of the antibacterial agent into food and denaturize its active sites, which ultimately lowers the reactivity with bacteria. However, antimicrobial-incorporated packaging allows antimicrobial agents to migrate slowly and continuously from the container to the food surface, which helps enhance the high concentration of antimicrobial agents over a longer period.

The packaging films prepared were evaluated for their mechanical properties. The packaging film of the present disclosure has a water vapor permeability in a range of 94,000-95,000 micrometer gram per second per square meter per pascal (g·μm/m$^2$·s·Pa). In another embodiment, the packaging film has an oxygen permeability in a range of 20,500-21,500 cm$^3$·μm/m$^2$·s·Pa.

The packaging films of the present disclosure demonstrate an antimicrobial activity against gram-positive and gram-negative bacteria, thereby enhancing the shelf-life of the food product. Also the food products consumed were found to be free of pathogens causing food borne diseases.

EXAMPLES

The disclosure will now be illustrated with examples, which are intended to illustrate the working of disclosure and not intended to take restrictively to imply any limitations on the scope of the present disclosure.

Example 1

Materials and Chemicals

Poly butylene succinate (PBS) pellet (density=1.26 gram/centimeter$^3$ (g/cm$^3$); Melting point=114° Centigrade (C); glass transition temperature=−32° C.) was purchased from Petroleum Authority of Thailand Public Company Limited (PTT Public Co. Ltd.) in Bangkok, Thailand, and while tapioca starch (TPS) powder (moisture=11.1%; bulk density=0.63 g/cm$^3$; gelatanization temperature=51° C.; viscosity=5.5 centipoises (Cp)) was procured from PTT Public Co. Ltd. Starch Solution International (Int.) in Karawang, Indonesia. Also, Sanafor (SAN) powder was provided by Indochine Bio Plastiques, Senai, Johor, Malaysia.

Example 2

Fabrication of PBS and PBS/TPS Films

PBS and PBS/TPS films were prepared through the melting-blow method since this technique can facilitate the dispersion of different added components with the PBS matrix. Antimicrobial composite of different concentrations, was incorporated into two different films, (i) PBS and (ii) PBS, with the addition of TPS. The pure PBS film was prepared using 100 weight % (wt. %) PBS pellets, while PBS/TPS film was prepared by mixing 40 wt. % TPS powder with 60 wt. % PBS pellets through melt-blown machine. For antimicrobial effect enhancement, different amounts of antimicrobial composite was added. The antimicrobial composite used is zinc, bis[1-(hydroxy-.kappa.O)-2(1H)-pyridinethionato-.kappa.S2]-,(T-4)- or Sanafor® (herein referred to as SAN). A total of 6 films were provided, as shown in Table 1. The films were manually laminated onto a kraft paper tray (11.5×9×5 cm) aseptically. The denotations and formulations for all produced films were shown in Table 1.

TABLE 1

Denotations and formulations of produced films

| S. No | Film Denotations | Amount of TPS (wt. %) | Amount of SAN (wt. %) |
| --- | --- | --- | --- |
| 1 | PBS | N/A | N/A |
| 2 | PBS 1% SAN | N/A | 1 |
| 3 | PBS 2% SAN | N/A | 2 |
| 4 | PBS/TPS | 40 | N/A |
| 5 | PBS/TPS 1% SAN | 40 | 1 |
| 6 | PBS/TPS 2% SAN | 40 | 2 |

Example 3

Characterization: Antimicrobial Activity Determination

The method of International Organization for Standardization (ISO) 22916 was used with some modifications to determine the antimicrobial activity of PBS films against bacteria of *Salmonella Typhimurium* (American Type Culture Collection (ATCC) 14028), *Escherichia coli* (ATCC 11229), and *Staphylococcus aureus* (ATCC 6538P). Active cultures were prepared by inoculating freshly cultured bacteria or pure colony (24 hours (h)) into lysogeny broth (LB) broth, then incubated in a shaker for 24 h at 30° C. with 200 revolutions per minute (rpm). The optical density (OD) for each culture was set to 0.05, equivalent to 1-2×10$^5$ colony forming units/millilitre (CFU/mL) by adding LB broth. About 0.4 mL volume of the prepared cultural suspension was aliquoted onto each PBS film (5 cm×5 cm) and overlaid with the same film (4 cm×4 cm) facing downward, followed by incubation in humidified condition at 30° C. for 24 h. Thereafter, re-suspension was carried out for each sample using 4.6 mL of 0.85 wt. % sodium chloride. Serial dilution was conducted, and 100 microlitre (μL) for each dilution was transferred to LB agar plates. Then, those agar plates were allowed to undergo incubation for 24 h at 30° C. Gentamicin was used as a positive control, and pure PBS film were used as negative control for the microbial culture. The antimicrobial effect of PBS films was determined from the microbial growth population following incubation. The whole antimicrobial process was conducted in triplicate to obtain average values. The microbial population was calculated as log CFU per mL sample, and the actual number in each dilution was determined for dishes containing 30-300 colonies using Equation 1 as below:

$$\text{Total count}\left(\frac{\log CFU}{\text{mL sample}}\right) = \log\left[\Sigma \frac{C}{V}(n1 + 0.1n2)D\right] \quad (1)$$

where C refers to total counts of bacteria in all retained dishes; V refers to volume used for sample dilution; n1 refers to number of retained dishes in first dilution; n2 refers to number of retained dishes in second dilution; D refers to dilution factor of first dilution.

Example 4

Characterization: Morphology Examination

Film samples were examined using a Hitachi S3000-N Scanning Electron Microscope (SEM) through 5 kilovolt (kV) accelerated voltage. In specimen preparation, those samples were immersed in liquid nitrogen and then fractured to expose the cross-sectional surface. The fractured samples were loaded on a stub and coated with platinum before viewing.

Example 5

Characterization: Functional Chemistry Analysis

Figure 3:
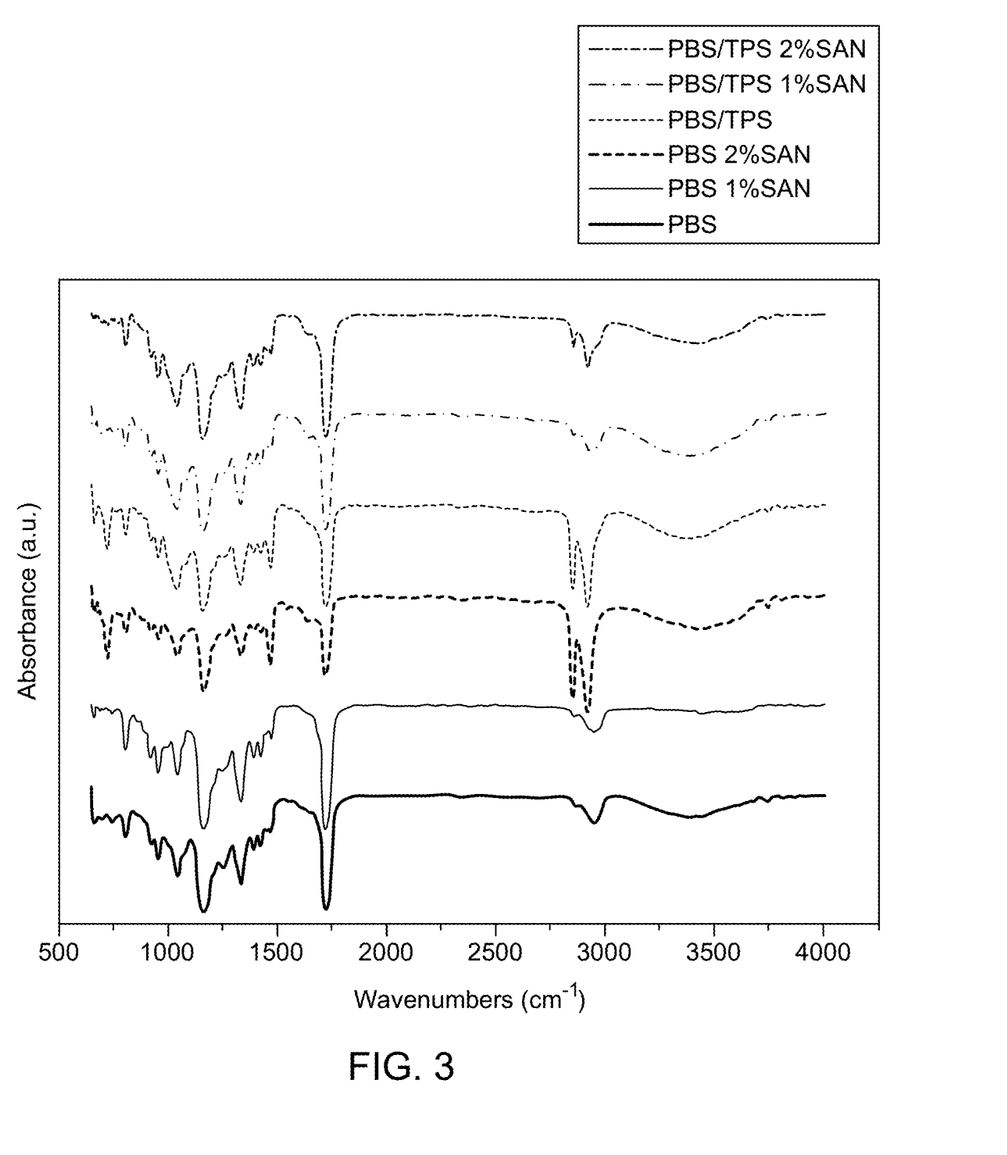
FIG. 3 depicts Fourier transform infrared (FT-IR) spectra of the packaging films.

Fourier transform infrared (FT-IR) spectrum of each film sample was analyzed using an attenuated total reflection (ATR) equipped Nicolet 380 FT-IR spectrometer, as can be observed in FIG. 3. The analysis was run for 32 scanning in wavenumbers of 200-4000 cm$^{-1}$ at 4 cm$^{-1}$ resolution.

Example 6

Characterization: Thermal Analysis

Figure 4A:
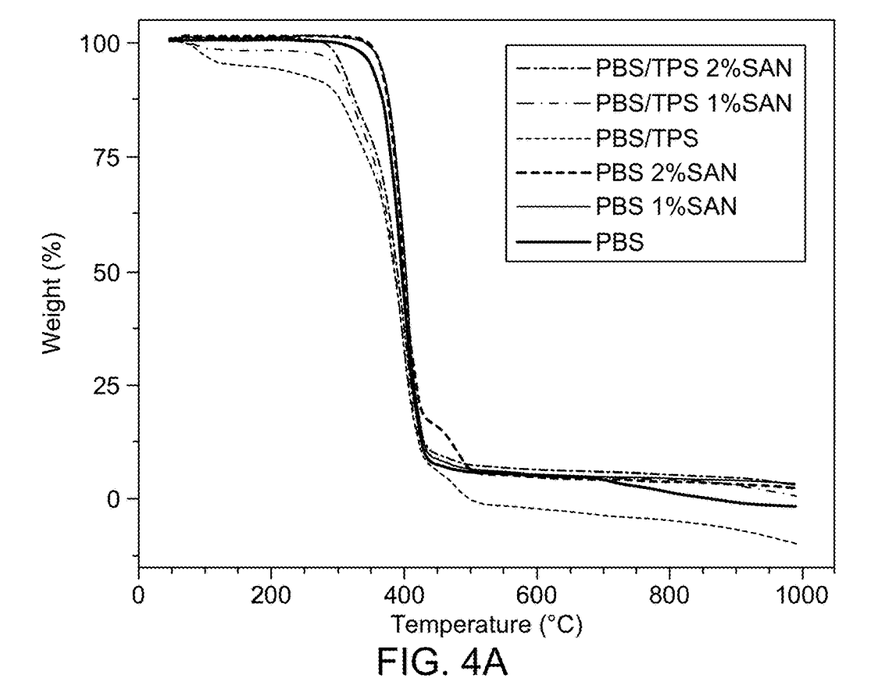
FIG. 4A denotes thermogravimetric analysis (TGA) curves of the packaging films.
Figure 4B:
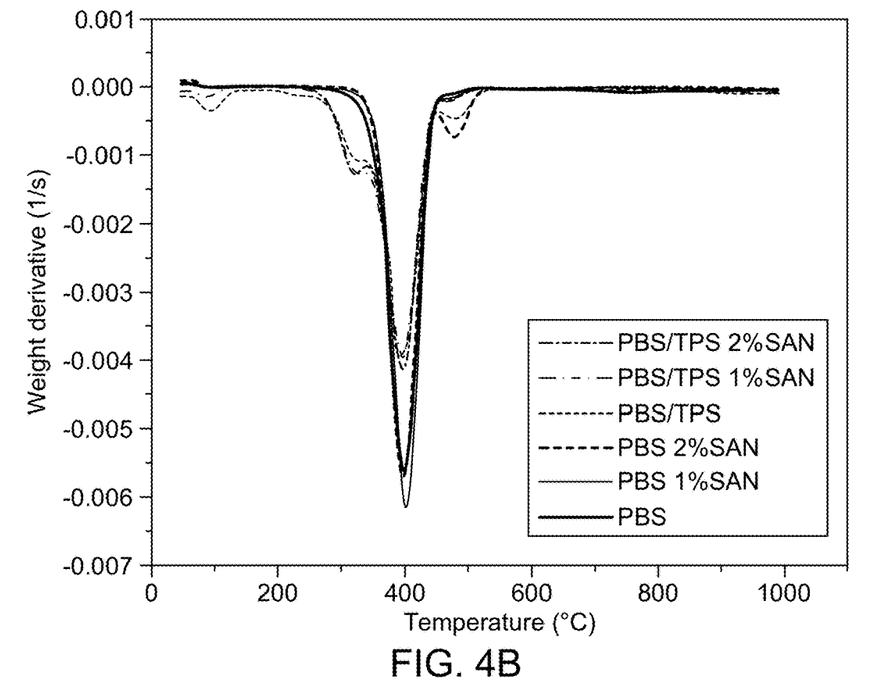
FIG. 4B denotes differential thermogravimetric (DTG) curves of the packaging films.

The Thermogravimetric analysis (TGA) analysis was conducted at a 20° C. per minute (min)$^{-1}$ heating rate under a nitrogen atmospheric condition from 25° C. to 1000° C. temperature range, as can be observed in FIG. 4A-FIG. 4B. The TGA data of PBS films were shown in Table 2. Also, the thermo-molecular characteristics were assessed using a Differential Scanning calorimetry (DSC) system. Those film samples were heated in 25-600° C. temperature range at heating rate of 20° C. min$^{-1}$ under nitrogen purge atmosphere.

Example 7

Characterization: Brunauer-Emmett-Teller (BET) Analysis

Brunauer-Emmett-Teller (BET) analysis was conducted to examine the surface area, total pore volume, and average pore size of film samples using a Micromeritics 3Flex equipment. Before analysis, each film sample was degassed for 20 min at 60° C. with nitrogen purging under vacuum condition of 50 kilopascal (kPa).

Example 8

Characterization: Permeability Analysis

Water vapor permeability was determined for each film using a Labthink W3/330 Water Vapor Transmission Rate Test System. The condition for flowing nitrogen gas was adjusted to partial pressure gradient of 50% to 75% relative humidity (RH) between the two chambers and the analysis was carried out at constant 25° C. temperature.

For oxygen permeability (cm$^3$ (standard reference point of temperature and pressure (STP)) μm/(square meter per pascal·m$^2$s·Pa)), it was assessed using a Systech 8001 permeameter at constant 25° C. temperature. Film samples were placed between the two chambers and the upstream chamber was maintained at 1 atmospheric (atm) oxygen partial pressure, whereas the downstream chamber was flown with nitrogen sweep gas. The oxygen flux was recorded with an internal equipped coulometric oxygen sensor until reaching steady state with plateau value.

Results and Discussion

Referring to FIG. 2A to FIG. 2F, a cross-sectional view of various packaging films examined under SEM is provided. FIG. 2A to 2F presented the cross-sectional feature of each PBS film sample through SEM examination. The pure PBS film showed apparently compact feature, signaling the great toughness of the sample film due to well-assimilated PBS polymer chains [Dorez, G.; Taguet, A.; Ferry, L.; Cuesta, J. L.; *Polym. Degrad. Stability* 2014, 102, 152-159]. With the incorporation of SAN, a more crystallized structure was noticed for PBS 1% SAN film, where certain parts of the film had formed the small pieces structure [Zhang, X.; Wang, X., *Carbohydr. Polym.* 2018, 196(15), 254-261]. However, the improved SAN loading to 2% had gradually changed the film into a ruptured surface morphology which was displayed by PBS 2% SAN film. This indicated that the 2% SAN loading was unfavorable and could adversely affect the integrity of PBS polymer [Manatsittipan, S.; Kuttiyawong, K.; Ito, K.; Tiptipakorn, S., *Key Eng. Mater.* 2018, 775, 26-31]. By mixing TPS and pure PBS, a thicker film with soft structure was revealed by PBS/TPS film and the phase isolation had happened through separating the polymers into the distinguishable top and bottom layers [Khalil, F.; Galland, S.; Cottaz, A.; Joly, C.; Degraeve., 2014, 108, 272-280; and Zhao, Y.; Qu, J.; Feng, Y.; Wu, Z., *Polym. Adv. Technol.* 2012, 23(3)]. When filling 1% SAN component, inter-stretching polymer feature was observed for PBS/TPS 1% SAN film, and while it also showed homogeneous polymer morphology as compared to PBS/TPS film without SAN loading. It was evidenced that the addition of 1% SAN could act as a compatibilizing agent in between TPS and PBS components [Lu, D.; Xiao, C.; Sun, F., *J. Appl. Polym. Sci.* 2012, 124, 3450-3455]. With further increased SAN loading, a more vertically broad film was exhibited by PBS/TPS 2% SAN, whereas with the presence of numerous micro-voids feature, showcasing the poor compatibility of these three components at this point [Phiriyawirut, M.; Mekaroonluck, J.; Hauyam, T.; Kittilaksanon., *J. Renew. Mater.* 2016, 4(3), 185-189; and Wootthikanokkhan, J.; Wongta, N, et. al., *J. Appl. Polym. Sci.* 2011, 1-8]. But, interestingly, the PBS/TPS 2% SAN film presents more effective antimicrobial activity than other samples as analyzed in antimicrobial section, possibly due to its loosen structure, that had greatly exposed the SAN material for antimicrobial effect.

The FT-IR spectra of film samples are illustrated in FIG. 3. The pure PBS film revealed the main reflection peaks at about 2952 $cm^{-1}$ ($CH_2$ vibration of methylene group), 1726 $cm^{-1}$ (C=O stretching of carboxyl group), 1331 $cm^{-1}$ (C—O stretching of ester group), and 1161 $cm^{-1}$ (C=O stretching of carbonyl group), indicating the typical functional groups of PBS chain molecules [Mizuno, S.; et. al., *Polym. Degrad. Stability* 2015, 117, 58-65]. With the addition of 1% SAN, the film of PBS 1% SAN showed slightly increased intensities at the peaks of 1726 $cm^{-1}$, 1331 $cm^{-1}$ and 1161 $cm^{-1}$, while with mildly reduced intensity at the peak of 2952 $cm^{-1}$. This implied the incorporation 1% SAN did not alter the film structure owing to the well integration with PBS polymer molecules [Abidin, A. S. Z.; Yusoh, K.; et. al., *Polym. Bulletin* 2017, 75, 3499-3522]. However, the three peak intensities at 1726 $cm^{-1}$, 1331 $cm^{-1}$ and 1161 $cm^{-1}$ were with reduced intensities for PBS 2% SAN film sample. Also, the intensity of peak at 2952 $cm^{-1}$, associating to the PBS backbone had increased tremendously for the sample. This showcased the long-chain PBS molecule had over exposed its $CH_2$ backbone surface due to poor compatibility between 2% SAN and PBS polymer [Lule, Z.; Ju, H.; Kim, J., *Ceramics Int.* 2018, 44(12), 13530-13537]. Moreover, some new intense sharp peaks had occurred on the PBS 2% SAN sample at 722 $cm^{-1}$, 1468 $cm^{-1}$, 2849 $cm^{-1}$, and 2920 $cm^{-1}$, showing unreacted PBS surface with SAN compounds.

Figure 5:
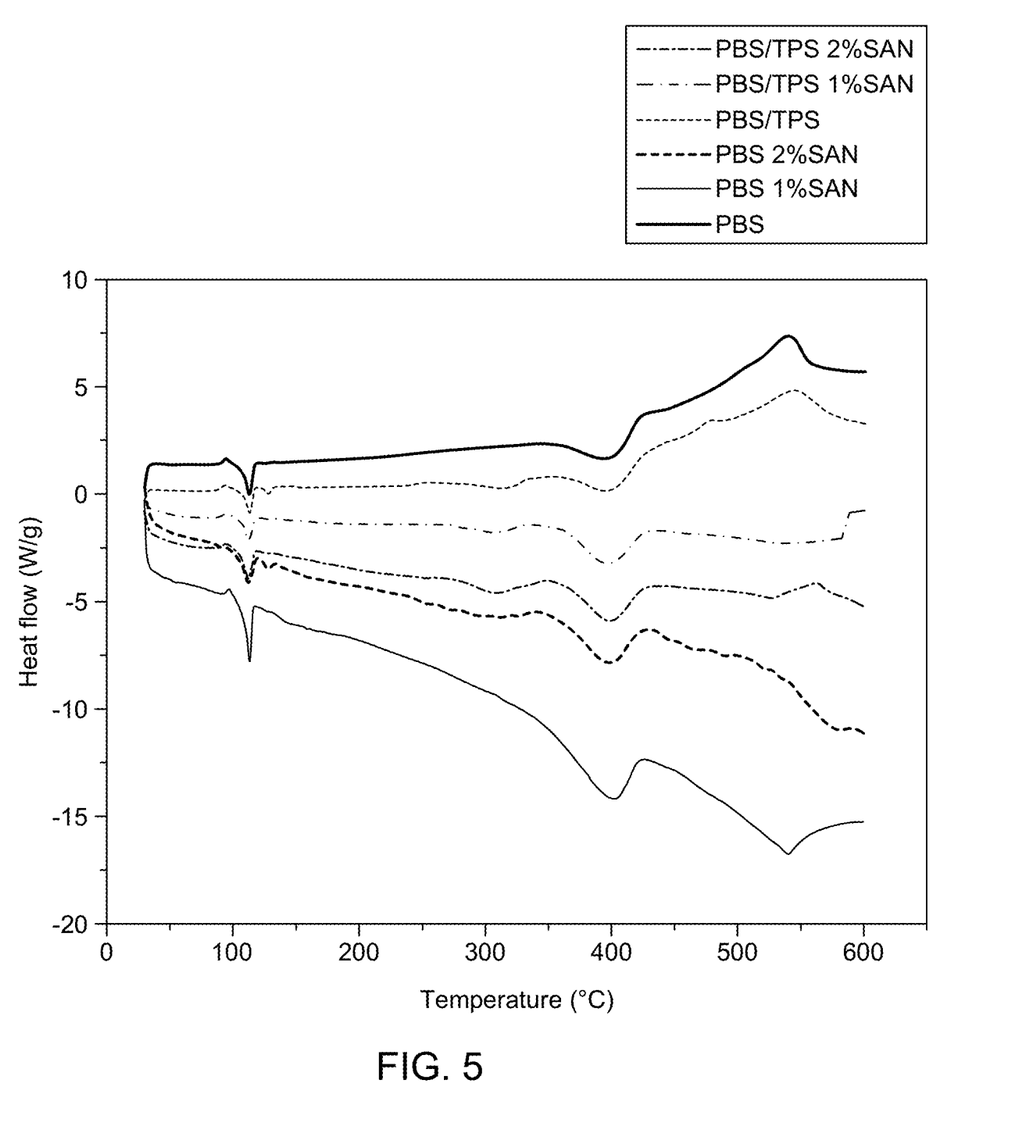
FIG. 5 denotes differential scanning calorimetry (DSC) spectra of the packaging films.
Figure 6A:
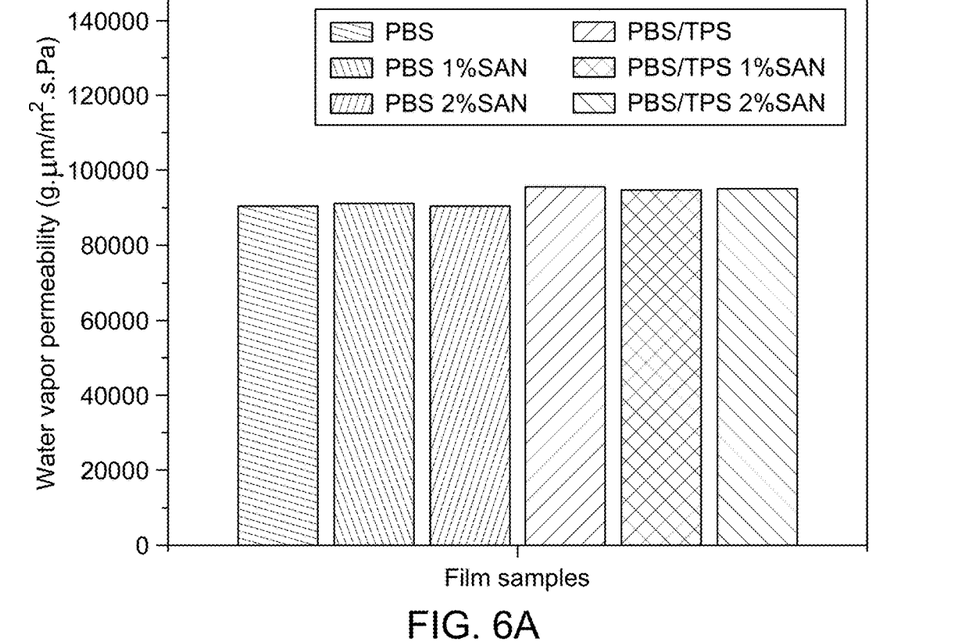
FIG. 6A is a bar graph depicting water vapor permeability of the packaging films.
Figure 6B:
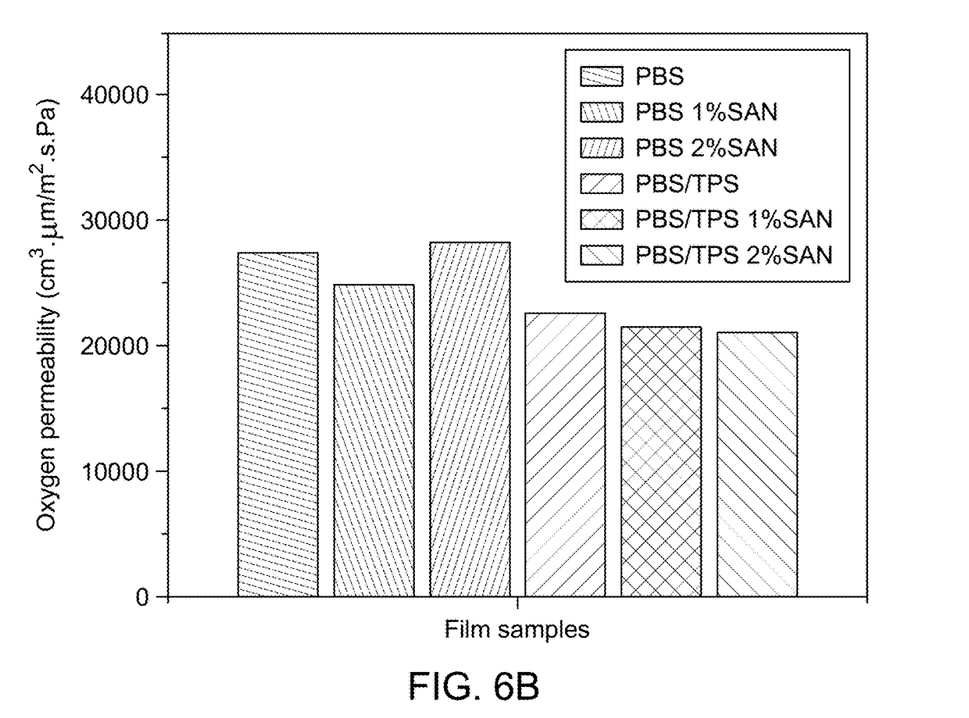
FIG. 6B is a bar graph depicting oxygen gas permeability of the packaging films.

Besides this, with closed inspection on FIG. 5, the PBS/TPS film also presented FT-IR pattern closely similar as PBS 2% SAN film. It supported the fact that these compositions would result in the deformation of polymer structure as examined in SEM viewing due to molecular immiscibility, as reported in the literature. But, the films of PBS/TPS 1% SAN and PBS/TPS 2% SAN more prone to exhibit similar FT-IR pattern as pure PBS film, evidencing the good interaction between the three components when mixed up together. In addition, the band broadened at around 3405 $cm^{-1}$ for both films, suggesting the enhanced stabilizing effect for PBS matrix through this compositional mixture. Furthermore, a shoulder band occurred at around 1643 $cm^{-1}$, was more prominently observed for both samples. It indicated some new interactions had formed between the three components. Between PBS/TPS 1% SAN and PBS/TPS 2% SAN, more intense sharp peaks had been revealed by PBS/TPS 2% SAN at 2852 $cm^{-1}$ and 2921 $cm^{-1}$ in comparison to PBS/TPS 1% SAN film. This signaled that less interaction was generated between polymer chains, which could be due to the agglomeration behavior of 2% SAN filling in PBS/TPS 2% SAN film [Zhang, M.; Li, Y.; Wang, L.; Li, S., *J. Appl. Polym. Sci.* 2019, 137(29), 48881].

The thermal decomposition of film samples was evaluated by thermogravimetric analysis (TGA) curves and derivative thermogravimetric (DTG) curves as shown in FIG. 4A and FIG. 4B, respectively, while the TGA and DSC analyzed data is listed in Table 2, and Table 3, respectively.

TABLE 2

TGA data of PBS films

| Samples | $T_{ON}$ (° C.) [a] | $T_{PD}$ (° C.) [b] | $W_{ML}$ (J/g) [c] | $R_F$ (%) [d] |
|---|---|---|---|---|
| PBS | 356 | 399.3 | 94.36 | 5.8 |
| PBS 1% SAN | 361.8 | 402.4 | 95.28 | 6.23 |
| PBS 2% SAN | 363.7 | 398.1 | 95.94 | 5.5 |
| PBS/TPS | 291.2 | 398.5 | 96.08 | 1.19 |
| PBS/TPS 1% SAN | 294.9 | 396.4 | 93.91 | 5.92 |
| PBS/TPS 2% SAN | 296.5 | 397.3 | 93.9 | 7.08 |

Note:
[a] onset decomposition temperature;
[b] peak decomposition temperature;
[c] maximum weight loss;
[d] residue formation.

TABLE 3

Differential scanning calorimetry (DSC) data of PBS films

| Samples | Tc (° C.) [a] | $T_m$ (° C.) [b] | $\Delta H_m$ (J/g) [c] | $X_C$ (%) [d] |
|---|---|---|---|---|
| PBS | 94.4 | 113.3 | 69.42 | 34.71 |
| PBS 1% SAN | 96.4 | 113.4 | 68.7 | 38.17 |
| PBS 2% SAN | 93.4 | 112.5 | 63.27 | 35.15 |
| PBS/TPS | 94.5 | 113.3 | 51.5 | 28.61 |
| PBS/TPS 1% SAN | 94.3 | 112.7 | 55.33 | 30.74 |
| PBS/TPS 2% SAN | 94.9 | 112.2 | 62.68 | 34.82 |

Note:
[a] crystallization temperature;
[b] melting temperature;
[c] melting enthalpy;
[d] crystallinity degree, $X_C = \Delta H_m/[\Delta H_{om} (1 - W_f)] \times 100\%$, where $\Delta H_{om}$ is the enthalpy of 100% pure PBS (200 J/g); $W_f$ is the weight fraction of active agents in the PBS film.

After SAN incorporation, both PBS 1% SAN and PBS 2% SAN films showed significant improvement of onset decomposition temperature ($T_{ON}$) (FIG. 4A). On comparison, PBS 2% SAN only exhibited a slightly higher $T_{ON}$ than the PBS 1% SAN film, which could be that the optimized thermal stability had been achieved and retained steadily, beyond addition of 1% SAN. Meanwhile, the unresolved curve observed for PBS 2% SAN in the 400-500° C. region, reflects the unsymmetrical decomposition of the film. Similarly, this defect decomposition behavior was also noticed for PBS/TPS. The introduction of TPS alone had gradually decreased the $T_{ON}$ of PBS/TPS 291.2° C., which was lower than that of pure PBS film at 356.0° C. It was likely due to the structural instability resulting in the reduced thermal resistance. However, better resolved curves were observed for PBS TPS 1% SAN and PBS TPS 2% SAN films, proving the stabilizing effect of this material as evaluated by FT-IR analysis. In addition, these mixture compositions had further improved their $T_{ON}$ to about 294.9° C. and 296.5° C., respectively, showing good integration of SAN in enhancing thermal tolerance for the PBS/TPS blend film.

From DTG curves presented in FIG. 4B, only PBS 1% SAN showed well-formed symmetrical curve as pure PBS sample, and exhibited the highest peak decomposition temperature ($T_{PD}$) at 402.4° C. in comparison to the other PBS blend samples. This signaled the uniform thermal decomposition behavior of PBS 1% SAN film owing to the good miscibility of 1% SAN with PBS polymer, reported in the literature. Those TPS filled films revealed an extra shoulder bands at around 326.5° C., 316.4° C., and 323.5° C. for PBS/TPS, PBS/TPS 1% SAN, and PBS/TPS 2% SAN, respectively. This showcased the effective introduction of TPS material in the PBS polymer matrix. Also, the observable additional peaks at about 479.9° C. and 481.1° C. for PBS 2% SAN and PBS/TPS films, were corresponding to the unsymmetrical decomposition as occurred in the 400-500° C. region for TGA curves.

Figure 7:
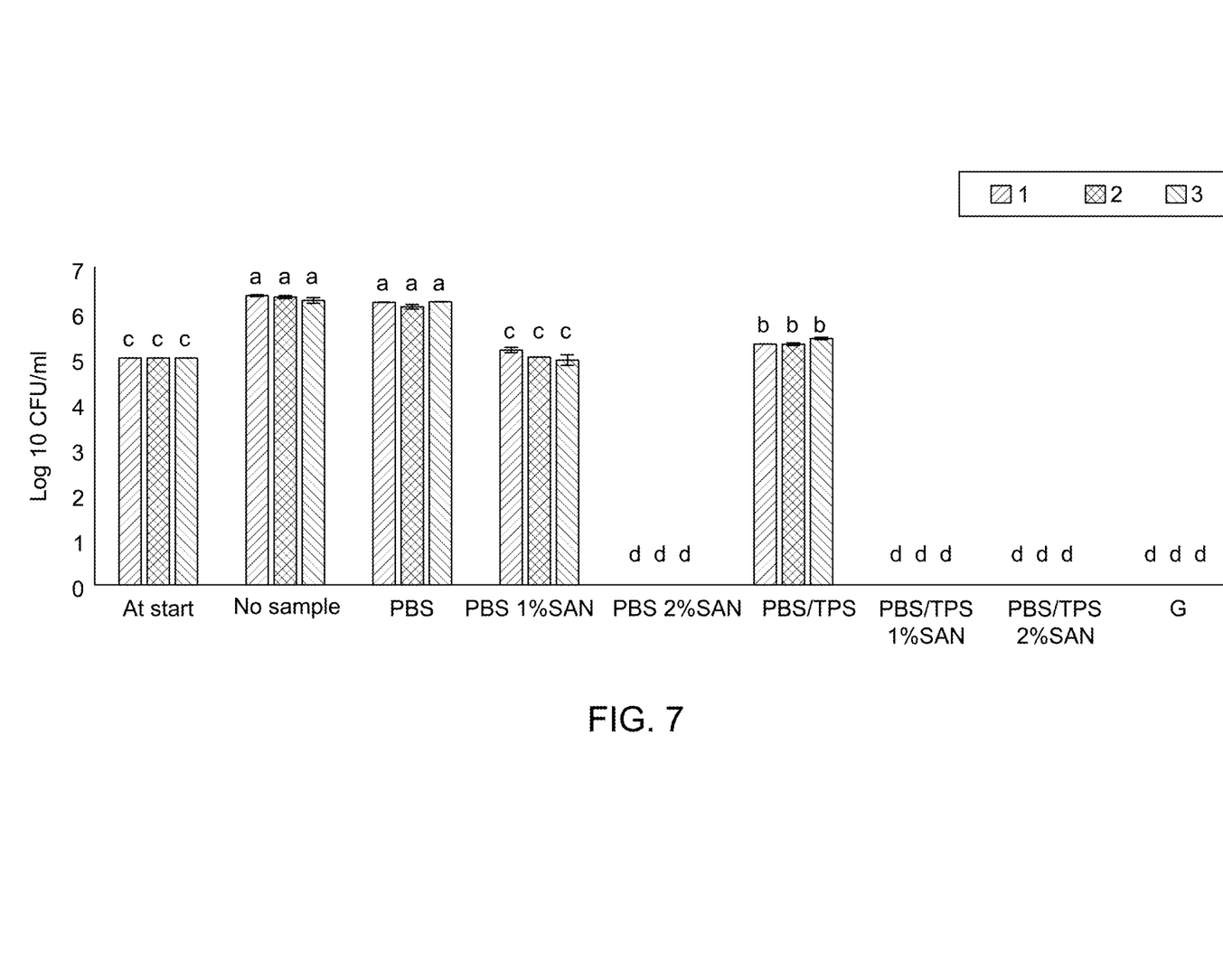
FIG. 7 is a bar graph depicting an antimicrobial activity of the packaging films (each having varying weight ratios of PBS and TPS) against *Staphylococcus aureus* (American Type Culture Collection (ATCC) 6538P)

The DSC spectra of film samples were illustrated in FIG. 7, while the data was summarized in Table 3. Pure PBS film showed its crystallization temperature (Tc) and melting temperature ($T_m$) at 94.4° C. and 113.3° C., respectively, indicating the typical thermal property of PBS molecules. Amongst the PBS blend films, only PBS 1% SAN sample showed significant improvement on Tc with 96.4° C., implying the addition of 1% SAN could act as nucleating agent for PBS matrix. However, the increased SAN loading to 2% had slightly reduced the $T_c$ of PBS 2% SAN to 93.4° C., probably due to the increased chains mobility of PBS molecules. As for TPS filled PBS films, they showed unaffected crystallization behaviour with Tc determined at around 94° C. which close to pure PBS film. Furthermore, all PBS blend films revealed almost similar $T_m$ that closed to the pure PBS film at around 113.3° C. However, the melting enthalpy ($\Delta H_m$) for each film was varied, possibly owing to the different component interactions with PBS polymer. Moreover, the crystallinity ($X_C$) was found to be the highest for PBS 1% SAN film, followed by PBS 2% SAN and PBS/TPS 2% SAN respectively. The results indicated the great crystallizing effect of SAN material in PBS films. From the DSC spectra, a serial endotherms and exotherms was observed for each sample beyond 250° C., implying the PBS were involved in the further polymeric decomposition process of liquefaction and gasification. For PBS 1% SAN film, there were only two endothermic peaks prominently noted at 402.9° C. and 540.3° C. It evidenced the consistent thermal absorption of this sample for polymeric decomposition process [Lule, Z.; Ju, H.; Kim, J., Ceramics Int. 2018, 44(12), 13530-13537].

Porosity, Water Vapor, and Oxygen Gas Permeability of PBS and PBS/TPS Films BET, water vapor, and oxygen gas permeability analysis of film samples is shown in Table 4. From BET analysis,

TABLE 4

BET, water vapor and oxygen gas permeability data of PBS films

| | BET | | | Permeability | |
|---|---|---|---|---|---|
| Samples | Surface area ($m^2/g$) | Total pore volume ($cm^3/g$) | Average pore diameter (nm) | Water vapor (g · μm/ $m^2$ · s · Pa) | Oxygen ($cm^3$ · μm/ $m^2$ · s · Pa) |
| PBS | 3.598 | 0.211 | 117.21 | 90170 | 27320 |
| PBS 1% SAN | 10.757 | 0.483 | 89.8 | 91200 | 24810 |
| PBS 2% SAN | 7.579 | 0.62 | 163.6 | 90320 | 28190 |
| PBS/TPS | 0.336 | 0.102 | 604.9 | 95400 | 22540 |
| PBS/TPS 1% SAN | 8.553 | 0.519 | 121.25 | 94660 | 21430 |
| PBS/TPS 2% SAN | 3.427 | 0.214 | 125.14 | 94890 | 20960 |

From the data summarized in Table 4, the determined average pore diameter was low for PBS 1% SAN with only 89.80 nm size, indicating the great nucleating effect of the SAN material in integrating PBS polymer. Meanwhile, the total pore volume had also increased for PBS 1% SAN as compared to pure PBS, showing that the formation of small size pores did not influence the overall porosity of the film, and this might help in facilitating the transport property of film, such as water vapor and gas permeability [Messin, T.; Guinault., et. al., J. Membrane Sci. 2020, 598, 117777; and Wiburanawong, S.; et. al., as an antimicrobial agent for poly (butylene succinate): Tensile properties and antimicrobial activity observations. Adv. Mater. Res. 2014, 931-932, 111-115.]. For PBS 2% SAN sample, the average pore size was gradually increased to 163.60 nm, probably due to the agglomeration of 2% SAN filling that resulted in the less interaction with PBS and forming larger pore size.

Further, the addition of TPS alone had tremendously increased the average pore size to 604.90 nm for PBS/TPS film. Conversely, the total pore volume and surface area were also dramatically reduced to 0.3362 $m^2/g$ and 0.1017 $cm^3/g$, respectively, which was far below than the pure PBS film. This could be attributed to the effect of TPS component in plasticizing PBS polymeric chains. During plasticization, continuous and co-continuous morphology might form between TPS and PBS in order for both components to assimilate with each other, and thereby reducing the overall surface area and total volume. Meanwhile, the unreacted fractions between TPS and PBS showed large average pore size.

Nevertheless, the filling of SAN into PBS/TPS films had improved the porosity by reducing the average pore size to 121.25 nm and 125.14 nm, for PBS/TPS 1% SAN and PBS/TPS 2% SAN, respectively. This was contributed by the crystallizing effect of SAN material that had overcome the structural defect of PBS/TPS film by decreasing the polymeric chains mobility, and ultimately suppressing the growth of porous structure. Moreover, the surface area and total pore volume were also increased for both samples, indicating that the SAN played the role in balancing the intermolecular interactions between TPS and PBS.

In FIG. 7, the pure PBS film was not significantly different (p>0.05) with the negative control (no sample), however, the PBS/TPS film exhibited slight reduction (p<0.05) of S. aureus (ATCC 6538P) population. In comparison between control (pure PBS and PBS/TPS films) and treated film samples, the populations of S. aureus (ATCC 6538P) were decreased (p<0.05) by addition of SAN into the PBS/TPS films. The PBS/TPS film with 1% and 2% SAN exhibited strong antimicrobial activity, and this sample was comparable with positive control, gentamicin. This indicates that PBS/TPS film with 1% and 2% SAN substantially terminated/reduced the growth/spread of S. aureus (ATCC 6538P) past the film/into the packaged food product.

Figure 8:
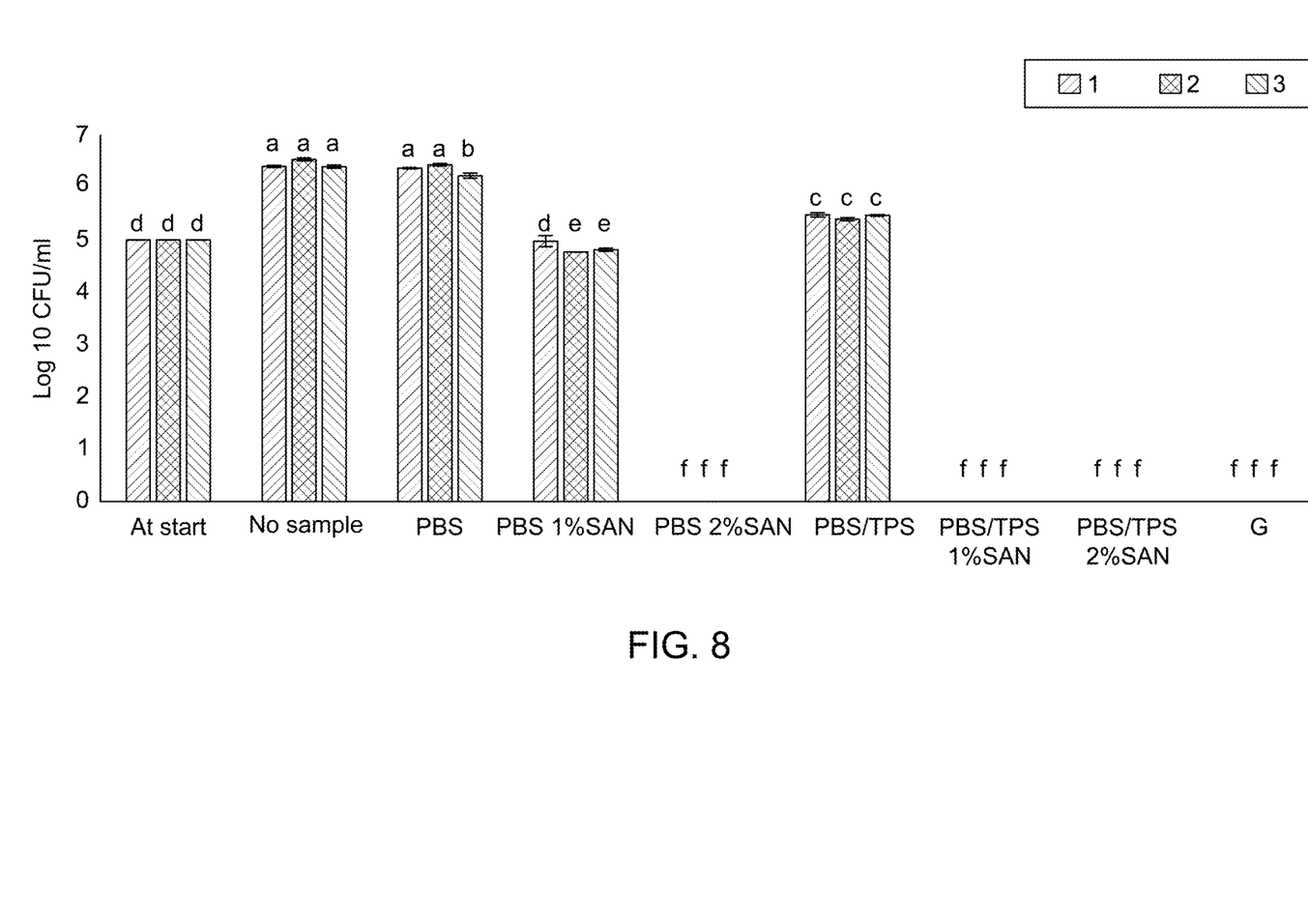
FIG. 8 is a bar graph depicting an antimicrobial activity of the packaging films (each having varying weight ratios of PBS and TPS) against *Escherichia coli* (ATCC 11229)

In FIG. 8, the pure PBS film was not significantly different (p>0.05) with the negative control (no sample), and the PBS/TPS film exhibited slightly reduction (p<0.05) of E. coli (ATCC 11229) population. Addition of SAN into the films also showed good antimicrobial activity against E. coli (ATCC 11229), especially the PBS/TPS films incorporated with 1% and 2% SAN, and these films were comparable with positive control, gentamicin. The other treated film samples also showed antimicrobial activity as follow: PBS/TPS with SAN>PBS with SAN>PBS/TPS films against E. coli (ATCC 11229).

Figure 9:
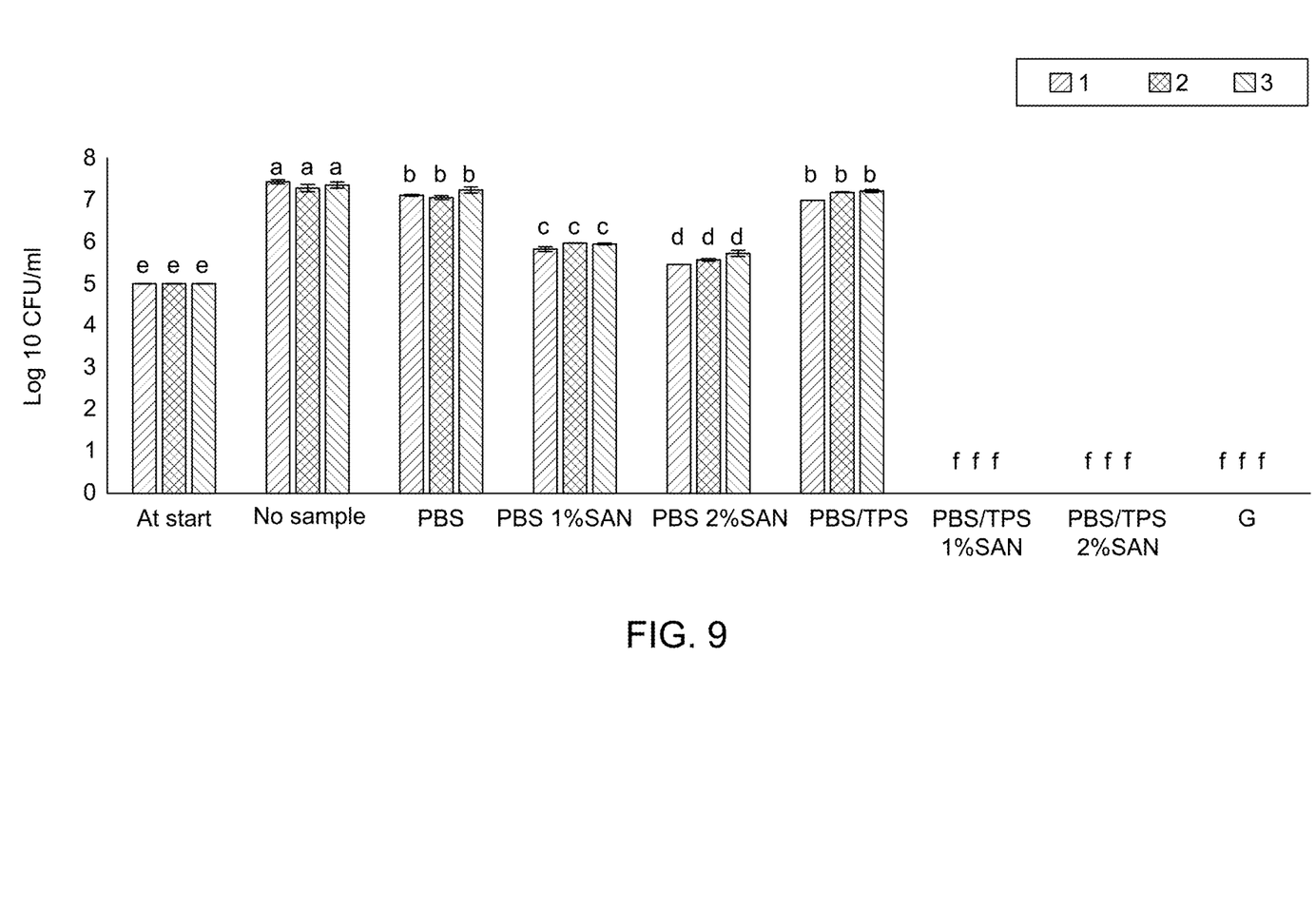
FIG. 9 is a bar graph depicting an antimicrobial activity of the various packaging films (each having varying weight ratios of PBS and TPS) against *Salmonella typhimurium* (ATCC 14028)

In FIG. 9, both pure PBS and PBS/TPS films was not significantly different (p<0.05) with the negative control (no sample). However, the SAN incorporated packaging films exhibited good antimicrobial activity against S. typhimurium (ATCC 14028) in PBS/TPS film. The other treated film samples also showed antimicrobial activity as follow: PBS/TPS films with SAN>pure PBS films with 2% SAN>pure PBS films with 1% SAN against S. typhimurium (ATCC 14028).

In this study, it was also observed that the treated film samples were more effective against *E. coli* (ATCC 11229), followed by *S. aureus* (ATCC 6538P) and *S. typhimurium* (ATCC 14028). The bacterial resistance was shown by the different degree of antimicrobial activity from each film in against each tested bacteria. Besides this, the superior suppression of bacterial growth presented by the produced films, especially SAN incorporated PBS/TPS films with 99.9% of bacterial reduction on *E. coli* and *S. aureus*. Hence, with using less amount antimicrobial agent, SAN was efficient in giving great antimicrobial effect, for developing high-performed antimicrobial packaging films.

The antimicrobial activity of six PBS films was compared with the positive control (gentamicin) and negative control (no sample). The antimicrobial activity of all films against *S. aureus* (ATCC 6538P), *E. coli* (ATCC 11229) and *S. typhimurium* (ATCC 14028) are shown in FIGS. 7-9 respectively. The cell number of each culture for this study was standardized into 5 log n/(CFU/ml) as initial (at start) bacterial concentration. Based on FIGS. 7-9, the populations of three bacteria without PBS film (no sample) were increased ($p<0.05$) after incubation, from 5 log n/(CFU/ml) (at start) to 6 log n/(CFU/ml), 6 log n/(CFU/ml) and 7 log n/(CFU/ml), respectively.

Among six PBS films, the treated PBS/TPS films (with SAN) showed the lowest ($p<0.05$) populations of all three bacteria than the pure PBS and PBS/TPS films. This indicates that the SAN exhibited antimicrobial effects even in pure PBS or PBS/TPS films. However, in comparison among treated PBS films (with SAN), the addition of SAN into the PBS/TPS film was more effective compared to the addition of SAN into the pure PBS film. This was likely due to the presence of hydrophilic TPS component in PBS film, that helped in interacting with SAN through physisorption process, and while the other active sites of SAN with positive charge able to continuously reacting with bacterial cell membrane, thereby suppressing their growth.

As discussed above, the SAN was successfully incorporated in PBS and PBS/TPS films using melt-blown technique. From morphology examination, the PBS/TPS films with 1% and 2% SAN revealed good film structure. This was supported by the FT-IR analysis showing that both film samples had insignificant change of spectra compared to pure PBS film. Moreover, the good compositional mixture of PBS/TPS films with 1% and 2% SAN endowed them with high surface area and total pore volume, as well as small pore size features. These elements further contribute to the films' ability to form a great barrier against water vapor and oxygen gas permeability. By antimicrobial analysis, the SAN acted as an antimicrobial agent in PBS/TPS films against *S. aureus* (ATCC 6538P), *E. coli* (ATCC 11229), and *S. typhimurium* (ATCC 14028).

INDUSTRIAL APPLICABILITY

The present disclosure provides a packaging film. A combination of SAN and TPS into PBS could produce antimicrobial packaging film with great performance for use in food packaging application. Also, the packaging film demonstrated excellent antiomicrobial properties against gram-positive and gram-negative bacteria (including food borne pathogens), thereby enhancing shelf life of food products by 5 to 6 days. The packaging film of the present disclosure helps hypermarket and supermarket to preserve vegetable and meat by using this antimicrobial film and also enhance hygienic and well being of people of country from food poising and other related food borne diseases, ultimately saving millions of government revenue. The packaging film of the present disclosure had a good porous structure which in line with its considerably high water vapor and oxygen gas barrier properties.

It is understood that the examples, embodiments, and teachings presented in this application are described merely for illustrative purposes. Any variations or modifications thereof are to be included within the scope of the present application as discussed.

ACKNOWLEDGMENT

The authors extend their appreciation to the Deputyship for Research & Innovation, Ministry of Education in Saudi Arabia for funding this research work through the project number "2021-010" and King Abdulaziz University, DSR, Jeddah, Saudi Arabia.

The invention claimed is:

1. A packaging film comprising:
    a polymer matrix comprising:
        polybutylene succinate (PBS),
        a modified tapioca starch (TPS); and
    an antimicrobial composite comprising an organometallic compound dispersed within the polymer matrix, wherein the organometallic compound is a zinc salt;
    wherein a weight ratio (w/w) of the PBS to the TPS is in a range of 3:2 to 2:3, and the packaging film has a water vapor permeability in a range of 94,000-95,000 micrometer gram per second per square meter per pascal.

2. The packaging film according to claim 1, wherein the PBS has a weight percentage in a range of 50-65% relative to a total weight of the packaging film.

3. The packaging film according to claim 1, wherein the TPS has a weight percentage in a range of 35-45% relative to a total weight of the packaging film.

4. The packaging film according to claim 1, wherein the antimicrobial composite has a weight percentage in a range of 1-2% relative to a total weight of the packaging film.

5. The packaging film according to claim 1, wherein the zinc salt is selected from zinc pyrrolidone carboxylic acid, zinc pyrrolidone, zinc pyrithione or a combination thereof.

6. The packaging film according to claim 1, wherein the zinc salt is zinc pyrithione.

7. The packaging film according to claim 1, wherein the antimicrobial composite is active against gram-positive and gram-negative bacteria.

8. The packaging film according to claim 1, wherein the antimicrobial composite is active against one or more of *Staphylococcus aureus, Escheria coli*, and *Salmonella typhimurium*.

9. The packaging film according to claim 1, comprising an oxygen permeability in a range of 20,500-21,500 centimeter cubed micrometer per second per square meter per pascal.

* * * * *